(12) United States Patent
Wilding et al.

(10) Patent No.: US 8,024,365 B2
(45) Date of Patent: Sep. 20, 2011

(54) DYNAMIC STATUS TREE FACILITY

(75) Inventors: Mark F. Wilding, Ontario (CA);
Alexander Abrashkevich, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 11/782,354

(22) Filed: Jul. 24, 2007

(65) Prior Publication Data

US 2008/0016096 A1   Jan. 17, 2008

Related U.S. Application Data

(63) Continuation of application No. 10/196,024, filed on Jul. 15, 2002, now Pat. No. 7,533,098.

(30) Foreign Application Priority Data

Dec. 21, 2001   (CA) ..................................... 2366183

(51) Int. Cl.
*G06F 17/30* (2006.01)
(52) U.S. Cl. ....................................................... 707/797
(58) Field of Classification Search ................... 707/609, 707/791, 793, 794, 795, 797, 802
See application file for complete search history.

(56) References Cited

U.S. PATENT DOCUMENTS

| | | | |
|---|---|---|---|
| 5,414,836 A | 5/1995 | Baer et al. | |
| 5,535,335 A | 7/1996 | Cox et al. | |
| 5,551,022 A | 8/1996 | Tariq et al. | |
| 5,606,669 A | 2/1997 | Bertin et al. | |
| 5,701,137 A | 12/1997 | Kiernan et al. | |
| 5,926,463 A | 7/1999 | Ahearn et al. | |
| 5,958,012 A | 9/1999 | Battat et al. | |
| 5,964,837 A | 10/1999 | Chao et al. | |
| 5,999,179 A | 12/1999 | Kekic et al. | |
| 6,061,723 A | 5/2000 | Walker et al. | |
| 6,101,556 A * | 8/2000 | Piskiel et al. | 719/313 |
| 6,128,016 A | 10/2000 | Coelho et al. | |
| 6,138,122 A | 10/2000 | Smith et al. | |
| 6,154,849 A | 11/2000 | Xia | |
| 6,182,136 B1 | 1/2001 | Ramanathan et al. | |
| 6,671,869 B2 | 12/2003 | Davidson et al. | |

(Continued)

OTHER PUBLICATIONS

Hood, Cynthia S., et al., "Intelligent Network Monitoring", Electrical, Computer and Systems Engineering Department, Rensselear Polytechnic Institute, Troy, NY, 1995, IEEE, pp. 521-530.

*Primary Examiner* — Diane Mizrahi
(74) *Attorney, Agent, or Firm* — Sawyer Law Group, P.C.

(57) ABSTRACT

A dynamic status tree facility for providing status information about one or more systems. The facility includes a tree data structure and methods for manipulating the data structure. The facility is accessible to provider processes using a set of provider interface methods. The facility is accessible to consumer processes using a set of consumer interface methods. The tree data structure is defined by nodes stored in shared memory and attached to by way of a defined data structure made available to the provider and consumer interface methods. The nodes in the tree data structure are defined to have a control block and a variable set of export data. The export data for any one node is specified by a variable in the control block. Certain of the exported data in the tree is representable in a format selected to have one of four defined properties.

68 Claims, 2 Drawing Sheets

U.S. PATENT DOCUMENTS

| | | | |
|---|---|---|---|
| 6,941,511 B1 * | 9/2005 | Hind et al. | 715/235 |
| 7,555,563 B2 * | 6/2009 | Ott et al. | 709/240 |
| 7,660,874 B1 * | 2/2010 | Meltzer et al. | 709/218 |
| 2002/0087612 A1 | 7/2002 | Harper et al. | |
| 2003/0110464 A1 * | 6/2003 | Davidson et al. | 716/17 |
| 2003/0126139 A1 * | 7/2003 | Lee et al. | 707/100 |

* cited by examiner

DYNAMIC STATUS TREE FACILITY

CROSS-REFERENCE TO RELATED APPLICATIONS

Under 35 USC §120, this application is a continuation application and claims the benefit of priority to U.S. patent application Ser. No. 10/196,024 filed Jul. 15, 2002 entitled "DYNAMIC STATUS TREE FACILITY", which claims the benefit of priority under 35 USC §119 to Canadian Application No. 2,366,183, filed Dec. 21, 2001, all of which is incorporated herein by reference.

FIELD OF THE INVENTION

The present invention relates generally to computing systems and in particular to a system for generating and maintaining a dynamic status tree facility.

BACKGROUND OF THE INVENTION

The prevalence of automated systems, such as computer operating systems and database management systems, has given rise to computer systems which are themselves used to determine the status of and to monitor, such automated systems. These program products that are used to oversee automated systems are sometimes termed monitoring or status facilities.

Determining the status of a software product in operation (assessing whether the product is in a "healthy state") may not be straightforward to accomplish programmatically. The information required to determine the health of a product or operating system may vary greatly over time. A monitoring program must be flexible enough to manage variations which can occur while an operating system or software product is active. This difficulty arises, for example, in systems that support dynamic reconfiguration of the number of CPUs on the system, the amount of memory on the system or the number of products on the system. Similarly, where products are self-tuning, monitoring facilities are required to change dynamically with the products. Where the facility providing a monitoring function is itself a significant drain on the resources of the system, the monitoring function may itself create system resource problems.

Due to the complexity in software products and operating systems, the information required by a monitoring system may not be readily available. The root cause of a problem with a system may be at a low level that is difficult to monitor on a continuous basis. As the monitoring process may interfere with the normal behavior of a product or system it would be advantageous to provide a monitoring facility that will selectively monitor aspects of the system, as required.

In complex computer systems different products exist in a heterogeneous environment and different monitoring facilities are typically provided for different products. The status of these different products are independently available and are not linked to each other. Similarly, where upgrades to products can occur without the operating system being taken off-line, the monitoring facility will ideally continue to operate and establish communication with the upgraded version of the product without requiring that the monitoring facility itself be restarted.

It is therefore desirable to provide a status facility that is dynamic, efficient to operate, and provides a single interface for obtaining the status of different software and other system components. The present invention addresses such a need.

SUMMARY OF THE INVENTION

According to an aspect of the present invention there is provided an improved system for generating and maintaining a status facility.

According to another aspect of the present invention there is provided a computer program product for a computing environment including provider processes for generating status information relating to one or more systems and consumer processes for obtaining selected information from the said status information, the program product including a computer usable medium having computer readable code means embodied in said medium for implementing a status facility, including computer readable program code means for defining and maintaining a tree data structure including nodes, computer readable program code means for defining and making accessible to the provider processes a set of provider methods, the provider methods including methods for the provider processes to create and define the content of nodes in the tree data structure, and computer readable program code means for defining and making accessible to the consumer processes a set of consumer methods, the consumer methods including methods for the consumer processes to access the content of nodes in the tree data structure.

According to another aspect of the present invention there is provided the above program product in which the content of each node in the tree data structure represents information and includes a control block and a set of export information data, the control block including data defining characteristics of the node and including an export variable, the set of export information data including a variable number of defining elements and for each defining element in the set of defining elements, an associated list of export data items, each defining element and associated list of items having a corresponding export information type specified by the export variable in the control block and selected from a defined set of export information types.

According to another aspect of the present invention there is provided the above program product in which each defining element specifies a starting position for, and the space occupied by, the list of items in the node associated with the defining element.

According to another aspect of the present invention there is provided the above program product in which the defined set of export information types includes an identifier type for identifying a node, a set of local property types for specifying status information, a set of base property types for specifying status information, a dependent node type for identifying dependent nodes in the tree data structure, a parent node type for identifying the parent node in the tree data structure, a provider type for specifying a provider process associated with a node, and a node control service type for specifying a service accessible by a consumer process for carrying out processing related to the node.

According to another aspect of the present invention there is provided the above program product in which the provider methods and the consumer methods comprise methods for attaching to and detaching from the root node of the tree, adding dependent nodes, activating and deactivating nodes, and creating, adding, deleting, getting and setting content of the nodes in the tree data structure and also methods for adding nodes to the tree data structure to replace one or more existing nodes in the tree data structure and for marking the replaced nodes as abandoned.

According to another aspect of the present invention there is provided the above program product in which selected content of the nodes in the tree data structure is storable in a register sized value in the computing environment.

According to another aspect of the present invention there is provided the above program product further including computer readable program code means for defining and making available a set of property tags for identifying nodes and export information data.

According to another aspect of the present invention there is provided the above program product in which selected information represented in the nodes is definable by one of a set of representing data properties, the set of representing data properties including, a register property, representable in the computer system by a register sized value and uniquely identifiable by the defined property tag, a variable property, representable in the computing environment by a data having a length longer than the register size and uniquely identifiable by the defined property tag, an identifier register property, representable in the computing environment by a register sized value and identifiable by the defined property tag in association with an identifier value, and an identifier variable property, representable in the computing environment by a data having a length longer than the register size and identifiable by the defined property tag in association with an identifier value.

According to another aspect of the present invention there is provided the above program product in which the node control block further includes a node tag identifier having a value selectably defined from the set of property tags.

According to another aspect of the present invention there is provided the above program product in which the nodes in the tree data structure are storable in shared memory and in which the consumer methods and the provider methods provide an interface to information stored in nodes in the tree data structure using the shared memory.

According to another aspect of the present invention there is provided the above program product further including computer readable program code means of defining a node access data structure permitting a process to attach to a node in the tree data structure, the node access data structure including information to specify the location of the node in the shared memory, the node tag identifier for the node, an identifier for the node, and control information for the node.

According to another aspect of the present invention there is provided the above program product, including computer readable program code means for implementing a node control facility including node control services and a set of methods selectably accessible by the consumer processes for the consumer processes to start, stop, interrogate status of, and pass requests to, the node control services.

According to another aspect of the present invention there is provided the above program product in which the node control services include computer readable program code means for expanding an identified node in the tree data structure into a sub-tree of the tree data structure.

According to another aspect of the present invention there is provided the above program product in which the nodes in the tree data structure are stored in shared memory and in which the consumer methods and the provider methods provide an interface to information stored in nodes in the tree data structure using the shared memory.

According to another aspect of the present invention there is provided the above program product in which the defined set of export information types is variable to permit provider processes to add one or more types to the defined set whereby provider processes may add export information data of the added types to the nodes of the tree data structure.

According to another aspect of the present invention there is provided the above program product in which the export variable includes a series of ordered bits, each bit in the export variable corresponding to a unique export information type.

According to another aspect of the present invention there is provided the above program product in which the defined set of export information types is variable to permit provider processes to add one or more types to the defined set whereby provider processes may add export information data of the added types to the nodes of the tree data structure and in which the export variable for each node includes bits defined to correspond to the added types.

According to another aspect of the present invention there is provided the above program product in which the computer readable program code means for defining and making accessible a set of consumer processes includes means for defining and making accessible a node search consumer process for traversing the tree data structure to locate the node in the tree data structure having content matching a search parameter provided to the node search consumer process.

According to another aspect of the present invention there is provided a method for storing in a computer system, and for providing access to, status information relating to one or more monitored systems, the method including the steps of accepting status information from a set of provider processes, creating and defining one or more nodes in a tree data structure and defining content for selected nodes in the tree data structure based on the status information accepted, accepting requests from a set of consumer processes for obtaining selected information from the nodes in the tree data structure and providing the selected information to the consumer processes by accessing the content of specified nodes in the tree data structure.

According to another aspect of the present invention there is provided the above method in which the step of defining content for selected nodes in the tree data structure includes the steps of defining information in a control block and in a set of export information data for each node in the selected nodes, the control block including data defining characteristics of the node and including an export variable, the set of export information data including a variable number of defining elements and for each defining element in the set of defining elements, an associated list of export data items, each defining element and associated list of items having a corresponding export information type specified by the export variable in the control block and selected from a defined set of export information types.

According to another aspect of the present invention there is provided a computer system usable by provider processes for generating status information relating to one or more monitored systems and by consumer processes for obtaining selected information from the said status information, the computer system including means for defining and maintaining a tree data structure including nodes, means for defining and making accessible to the provider processes a set of provider methods, the provider methods including methods for the provider processes to create and define the content of nodes in the tree data structure, and means for defining and making accessible to the consumer processes a set of consumer methods, the consumer methods including methods for the consumer processes to access the content of nodes in the tree data structure.

According to another aspect of the present invention there is provided the above computer system in which the content of each node in the tree data structure represents information and includes a control block and a set of export information data, the control block including data defining characteristics of the node and including an export variable, the set of export information data including a variable number of defining elements and for each defining element in the set of defining elements, an associated list of export data items, each defining element and associated list of items having a corresponding export information type specified by the export variable in the control block and selected from a defined set of export information types.

Advantages of the present invention include low overhead communication between provider processes, the tree facility and consumer processes, up level and down level support, support for changes to the system about which tree facility stores and provides information and a "drill down" capability.

DETAILED DESCRIPTION

The present invention relates generally to computing systems and in particular to a system for generating and maintaining a dynamic status tree facility. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
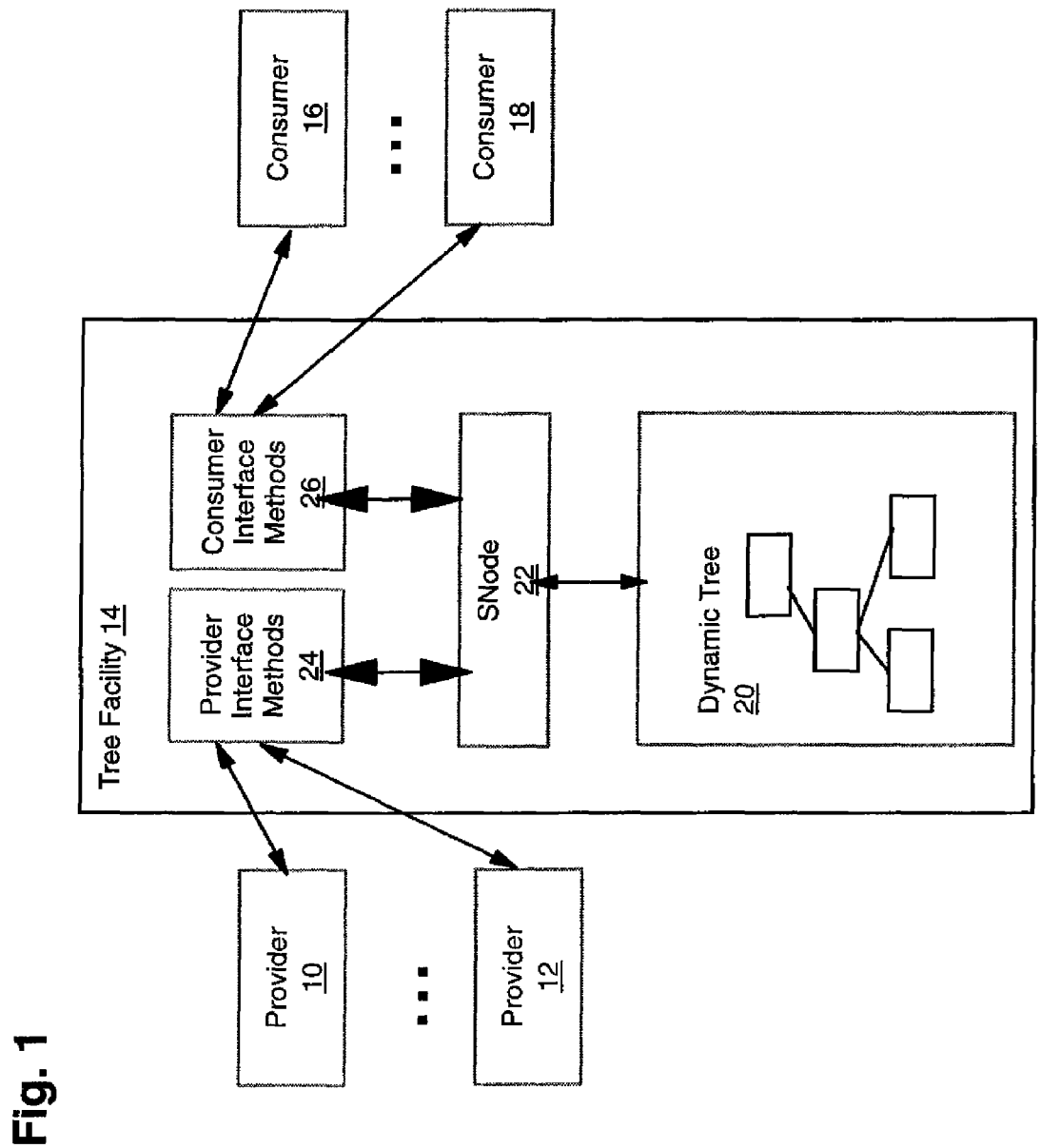
FIG. 1 is a block diagram showing an example illustrating the architecture of the dynamic tree facility of the preferred embodiment.

FIG. 1 shows the structure of the dynamic tree facility of the preferred embodiment, in a block diagram format. Providers 10, 12 represent a potentially numerous set of processes that update tree facility 14 with information relating to a defined system. Consumers 16, 18 represent a potentially numerous set of processes that access tree facility 14 to access data regarding the status of one or more aspects of the system. Tree facility 14 includes a dynamic tree structure 20, described in more detail below. In the preferred embodiment, tree facility 14 is a combination of data structures and methods for manipulating these data structures, as is set out in this description. Nodes in tree 20 are attached to using the information in SNode structure 22. Providers 10, 12 create the nodes of tree 20 and update information stored within each node. Consumers 16, 18 typically walk tree 20 in a read only fashion to gather information stored in nodes within tree 20. As is described in further detail below, by traversing tree 20, consumers 16, 18 may initiate processes (referred to as node control facilities) which modify the content or structure of tree 20.

Access to tree 20 is provided to providers 10, 12 by provider interface methods 24 and to consumers 16, 18 by consumer interface methods 26. In the preferred embodiment, certain methods are accessible both to providers 10, 12 and to consumers 16, 18.

The architecture of tree facility 14 is defined to provide for low overhead communication between providers 10, 12 and tree facility 14 and between consumers 16, 18 and tree facility 14. The architecture also provides for, up level and down level support. Changes to the system about which tree facility 14 stores and provides information may be made without requiring the facility to be restarted. When a restart does occur, the tree facility is able to be restarted quickly so as to minimise downtime. The architecture of tree facility 14 incorporates a "drill down" characteristic, as is described in more detail below.

The nodes in tree 20 are equivalent to each other with respect to functionality. The top node of tree 20 is distinguished from other nodes in the tree however, due to its root position in the tree and due to the fact that information about how to attach to this top node in tree 20 is defined to be well known in tree facility 14. Consumers 16, 18 may or may not be processes that contain logic to access and make use of data contained in, and exportable from, a given node in tree 20. Where a consumer process does not contain logic which understands the information exported from a node, that node will appear to the consumer process to be the equivalent of any other such node in the tree in that these nodes will only provide information about the current structure of tree 20 (for example, information about the parent node and the dependent nodes, if any).

In the preferred embodiment, the underlying platform for tree facility 14 has shared memory and atomic instructions to update status values. Communication between provider processes and consumer processes is efficiently carried out by use of the shared memory segments into which data in tree 20 nodes are stored. When a node in tree 20 is attached to, data may therefore be transferred quickly through the use of shared memory. Data is accessed by the accessing process being provided with the shared memory segment and offset for the node and the relative offsets to the data, as defined further, below. In the preferred embodiment, the underlying platform for tree facility 14 provides for efficient attachment and detachment from shared memory segments.

The particular structure of a given tree 20 is defined by the provider processes generating and updating nodes in the tree using provider interface methods 24. The design of the architecture does not impose requirements about what structure a specific individual tree will have, although it should be well structured for ease of use. There may be many nodes within a shared memory segment. Each node in tree 20 has a control block that specifies information defining local properties and export data. The structure of the control block of the preferred embodiment is expressed as follows (the following examples are in the C language):

```
typedef struct SNodeCB{
    Uint32 VarOptions;
    Uint32 VarSizes;
    SNodeVar_t SizeofNode;
    SNodeVar_t NodeTag;
    SNodeVar_t CodePage;
    SNodeVar_t Exports;
    SNodeUpdate_t UpdateInfo;
    SNodeConcurrency_t ConcurrencyInfo;
}SNodeCB_t;
```

In the above definition, SNodeVar_t represents a variable type defined for the implementation of tree 20. The details of the variable type may vary between different implementations of the tree structure. As will be apparent from the description of the preferred embodiment, the status tree facility described is intended to be of general application and to be capable of being implemented in different manners while retaining the functionality of the preferred embodiment.

Local information in each node in tree 20 defines characteristics of the node itself. Each node may also include export information. In the node structure set out above, local information is specified by variables SizeofNode, NodeTag, Code- Page, UpdateInfo and ConcurrencyInfo. The NodeTag variable is a property tag describing the node (property tags are described in further detail below). SizeofNode has a value equal to the size of the entire node, including the control block. CodePage stores the codepage number. A codepage is a list of selected character codes in a certain order. Codepages are usually defined to support specific languages or groups of languages which share common writing systems. VarOptions contains all of the information needed to support compatibility issues including: endianess, the number of lists in the control block, register size, a version number and the size of the common variables in the control block. VarSizes variable provides information about the sizes of various variables used for the dynamic status tree facility. UpdateInfo stores information indicating whether the node is continuing to be updated. ConcurrencyInfo stores information about how the provider is arranging for concurrency for the node.

In the preferred embodiment, the export information in a node is located immediately following the control block. Export information is represented as an array of structures with one defining element for each type of information that is exported. There are two different variables for each defining element of exported information that specify the size of the exported area and the maximum size of the area. Although consumer processes are designed to handle the case where a node is abandoned and reconstructed, it is advantageous to provide extra space for each export data area in the nodes of tree 20 (i.e. the maximum space for the export information in the node is initially defined to be greater than the current space required). This will reduce the need to reconstruct a node if export information changes so as to require additional space in the node.

In the preferred embodiment, the structure for each defining element in the array of export information is:
```
typedef struct PExport{
    SNodeVar_t MaxSpace;
    SNodeVar_t CurSpace;
    SNodeVar_t Offset;
} PExport_t;
```
In the above structure, MaxSpace defines the maximum space for the list of export information data items of the same type. The CurSpace variable defines how much space is currently used in the list and the Offset variable defines the offset from the beginning of the node to the start of the list.

Figure 2:
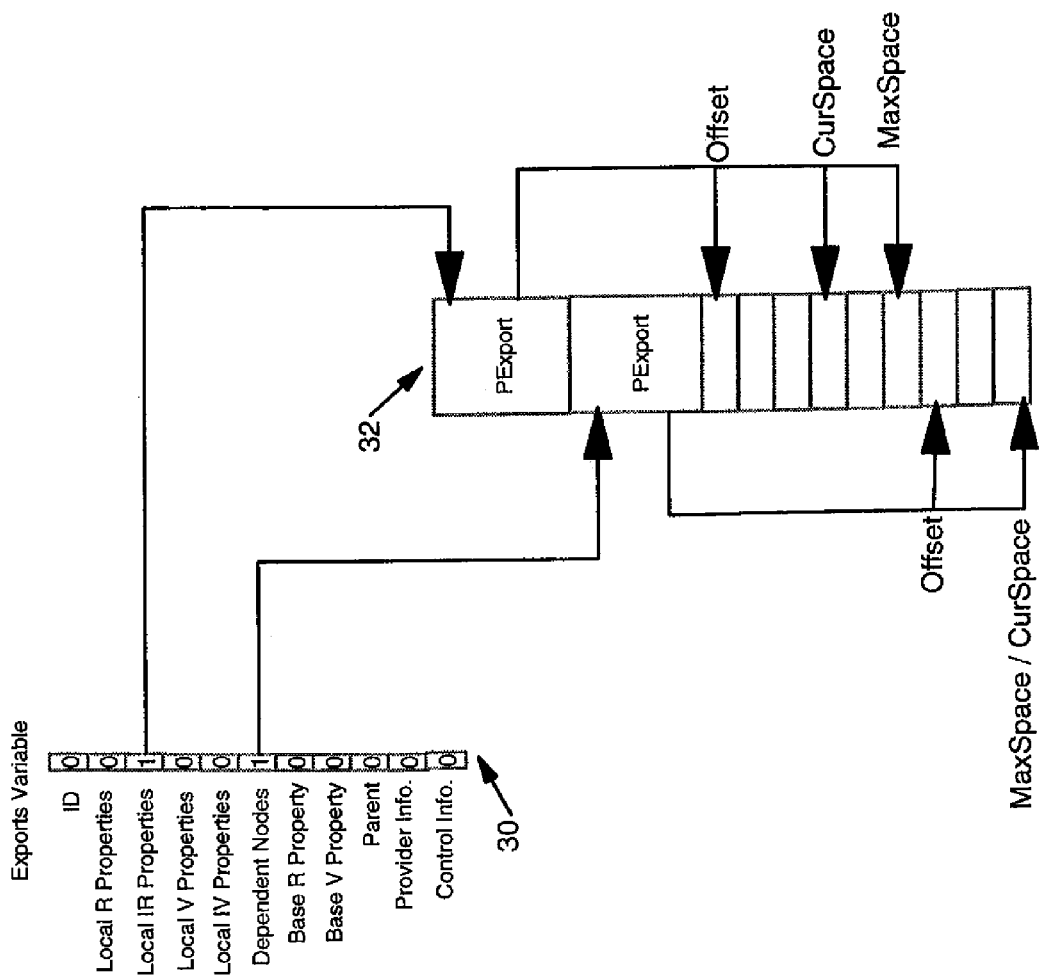
FIG. 2 is a block diagram showing an example of the structure of data represented in a node in the tree data structure of the dynamic tree facility of the preferred embodiment.

Using the structure defined above, the node may contain a variable number of export information items. The Exports variable in the node control block structure defines the properties of export data that are present in the node. FIG. 2 shows, in a block diagram form, the relationship between the Exports variable and the information in the exports portion of an example node. The example of FIG. 2 shows the Exports variable with the defined set of possible information as in the preferred embodiment.

The set of possible export information is:
Identifier
Local R Properties
Local IR Properties
Local V Properties
Local IV Properties
Dependent Nodes
Base R Property
Base V Property
Parent
Provider Information
Control Information The set of possible information is represented in Exports variable 30 shown in FIG. 2. In the Figure, Local IR Properties and Dependent Nodes are shown as being flagged in the Exports variable (the corresponding bit in the variable is set to the value 1).

The PExport data that is located immediately following the control block in the node is ordered so as to correspond to the bits turned on in the Exports variable. The number of PExport data elements is defined by the number of bits with the value 1 in the Exports variable. The Exports variable defines a number of well known bits, one for each type of export information that is supported. Consumer and Provider processes are therefore able to carry out a comparison at each bit location in the Exports variable and associate each defining element in the node with a defined type of data based on the order of turned on bits in the Exports variable. The architecture of the preferred embodiment permits other types to be added in the future without breaking up/down level support.

This correspondence between the bits in the Exports variable and export information 32 is shown in FIG. 2. The first defining PExport data element in export information 32 corresponds to the first turned on bit in the Exports variable. In the case of FIG. 2 this is the Local IR Properties bit. The first PExport element has variables that effectively point into the set of export data to define the list of information of that type that is available for export. Similarly, the second PExport element in export information 32 corresponds to the Dependent Nodes bit in Exports variable 30. The PExport element points into export information 32 to define the data indicating the dependent nodes of the FIG. 2 node. The example of FIG. 2 shows the first PExport element (Local IR Properties) pointing to the offset location where the corresponding information is found, and having a maximum size and a current size which are different. The second example PExport element is shown with a maximum size equal to the current size.

As set out above, in the preferred embodiment, the information that may be stored in a node includes the following types: Identifier, Local R Properties, Local IR Properties, Local V Properties, Local IV Properties, Dependent Nodes, Base R Property, Base V Property, Parent, Provider Information, and Control Information. The identifier information (ID information) is used to identify the node. In some cases, the NodeTag for a node will be sufficient to uniquely identify the node (as is described in more detail below). In other cases, to uniquely identify the node an identifier will be required. The Identifier variable in the export information section of the node contains this information. The four types of local properties are available for lists of information usable to describe the node or the system or component for which the node provides status information. The dependent node information identifies one or more dependent nodes from the current node.

The two base properties are a register property and a variable property (as defined below) that are also available for node or status descriptive purposes. The base properties are singular as opposed to potentially comprising a list as is the case with the local properties. The parent information identifies the parent node in the tree. Provider information specifies information about the provider process that is associated with the node. In the preferred embodiment, the provider information contains the process identifier and the thread identifier for the provider. Control information specifies a node control facility that may be associated with the node, as is described in more detail, below.

In the preferred embodiment, the following four types of properties are supported. These four types permit a broad range of information to be stored in the nodes of tree 20:

RProperty—This defines a property with a register sized value that is uniquely specified by the property tag.

VProperty—This defines a property with a non-registered sized value that is uniquely specified by the property tag (this requires a latch or similar mechanism to carry out an update/read).

IRProperty—This defines a property with a register sized value that is not unique by property tag alone. The property therefore requires an identifier for unique identification.

IVProperty—This defines a property with a non-register sized value that is not unique by property tag alone. The property therefore requires an identifier for unique identification and a latch or similar mechanism for updates/reads.

The performance and concurrency is highest if a property value in a node can be stored in a register sized variable. Some properties, however, have a variable sized value (for example, a database name). In a concurrent system, to update this type of property and maintain data integrity, a latch or similar mechanism must be used.

The data structures used in the preferred embodiment for the four different types of properties are set out in the C language as follows:

```
typedef struct RProperty {
    SNodeVar_t Tag;
    SNodeVar_t rc;
    OSSAtomic Value;
} RProperty_t;
typedef struct VProperty {
    SNodeVar_t Tag;
    SNodeVar_t rc;
    SNodeVar_t ValueOffset;
    SNodeVar_t ValueSize;
    LatchInfo_t Latch;
} VProperty_t;
typedef struct IRProperty {
    SNodeVar_t Tag;
    SNodeVar_t rc
    SNodeVar_t IDOffset;
    SNodeVar_t IDSize;
    OSSAtomic Value;
    LatchInfo_t Latch;
} IRProperty_t;
typedef struct IVProperty {
    SNodeVar_t Tag;
    SNodeVar_t rc;
    SNodeVar_t IDOffset;
    SNodeVar_t IDSize;
    SNodeVar_t ValueOffset;
    SNodeVar_t ValueSize;
    LatchInfo_t Latch;
} IVProperty_t;
```

In the above data structures, the Tag variable represents a well known number for the property, as is described in more detail, below. Down level consumers may not "understand" an up level property tag but backward functionality is maintained by consumers being defined to handle cases where property tags are have unknown values. The rc variable referred to in the above definitions represents a return or error code that may be used when the provider is unable to obtaining the particular property value. The Value variable contains the actual value of the property. The variable used will vary depending on the implementation for the tree. For example, for an RProperty value, the Value variable could be a single register sized variable or a structure containing a latch and register sized variable (for architectures that do not support atomic instructions for register-sized values, such as the PA-RISC 1.0 and 2.0 architectures). For the values that cannot be stored in a register, offset (ValueOffset) and size information (ValueSize) is provided and a latch mechanism is also provided for (Latch) using the LatchInfo_t structure containing information about the specific latch implementation. For properties requiring an identifier for unique identification, namely IRProperty and IVProperty, offset (IDOffset) and size information (IDSize) for property identifiers are provided.

As the above indicates, nodes in tree 20 may include complex data identifying the node and may store status information obtained from provider processes 10, 12 and available to consumer processes 16, 18. For example, a node may represent a system resource such as a disk drive. The node may contain information about the characteristics of the system resource and resource usage.

The use of base property values in nodes is illustrated using the disk example. In the preferred embodiment, when a property that has an associated list of properties is to be exported, the provider processes should create a separate node for that base property.

Using the example, if a disk in a system is defined only by a name (i.e. absolute path) and one property (i.e. size), then information about the resource can be stored and exported as a single property (IRProperty). If the disk is represented in the status facility by multiple properties, (i.e. size, speed, load, serial number, etc) then it is advantageous to represent the resource as a node with multiple properties.

As referred to above, one aspect of the facility of the preferred embodiment is the unique identifiers that are defined for each type of property. These unique identifiers or property tags are implemented as integers in the preferred embodiment. The numbers representing the tags start at zero and are incremented as new types of properties are needed. Obsolete property tags can only be reused when the down level versions of the facility using those tags are no longer supported. For the preferred embodiment, the storage for these property tags is a 32 bit scalar which allows roughly 4.3 billion different property types. It is anticipated that such a large number of potential tags will be sufficient for current purposes.

The preferred embodiment uses a section in a header file to define property tags. A fragment of an example header file is set out as follows:

```
#define NULL_PROPERTY          0
#define FREE_MEMORY            1
#define AVAILABLE_MEMORY       2
#define LAST_PROPERTY_TAG      3
```

In the preferred embodiment, only the first property tag is defined by the architecture of the status facility. A property tag of zero represents an unused property and can be used to tell consumers to skip over a particular property.

Both nodes and export data are provided with property tags that specify the nature of the node and export data, respectively. The inclusion of the tag definition header file information in processes accessing the dynamic tree facility permits information to be correctly identified by providers and consumers.

As shown in FIG. 1, attachment to a node in tree 20 is achieved using the SNode data structure. The C definition of this data structure as implemented in the preferred embodiment is as follows:

```
typedef struct SNode {
    ShmInfo_t SegmentInfo;
    SNodeVar_t Offset;
    SNodeVar_t NodeTag;
```

```
    SNodeVar_t IDSize;
    SNodeVar_t IDOffset;
    GCFVar_t GCFInfo;
} Snode_t;
```

The first two variables in the structure define the minimum amount of information to attach to a new node. The SegmentInfo variable uniquely describes an existing shared memory segment. The Offset variable defines the offset within the shared memory segment where the node control block is found. The NodeTag is one of the well known property tags, referred to above. As described above, some nodes will be uniquely identified by the property tag, and for others, an identifier is required to uniquely identify the node. In this case, the IDSize and IDOffset define the identifier in the export data of the node.

The final information contained in structure is the GCFInfo variable information. This is an exported method that can be used to control the node. When such an exported method is used the node is considered to be activated. Examples of activation of a node, for a database status tree facility, include turning on the database engine for an instance, starting a database partition, or turning on a snap shot monitor. There is no requirement that each node have control information, the ability is only included as an option for providers.

In the preferred embodiment, as is shown in FIG. 1, it is not intended that the providers 10, 12 or consumers 16, 18, access dynamic tree 20, directly. A set of provider interface methods 24 and consumer interface methods 26, are provided. These methods (or functions) attach to the nodes in tree 20 and provide for access to those nodes by both providers 10, 12 and consumers 16, 18.

These functions provide the ability to attach, detach, activate and deactivate nodes. Since the control information for a node in tree 20 is exported by the SNode_t structure, a calling function in provider interface methods 24 or consumer interface methods 26, may potentially activate or deactivate the node without being attached. Once activated, the shared memory segment information and offset in the SNode_t structure is completed with the appropriate information.

The methods provided for in tree facility 14 will depend on the implementation of tree 20. The methods will include methods for attaching to and detaching from the root node in the tree, creating nodes, activating and deactivating nodes, obtaining information from the node control block, adding dependent nodes, creating, adding, deleting, getting and setting property values in the export information for the node, and finding particular nodes in tree 20. The methods permit providers to generate and modify nodes in tree 20 and to supply status information to those nodes. The methods permit the consumer to query a node to determine what information is stored in the node or available from the node after activation. The consumer will then be able to determine if the information is required by the consumer, or not.

In the preferred embodiment the methods include a mechanism for abandoning a node. This permits consumers to traverse nodes that are being replaced in tree 20 before the replacement step is completed. This is used in making the transition from an obsolete to a new tree structure. The system of the preferred embodiment supports concurrent provider and consumer threads and processes. The system is also designed to permit changes to the tree structure without requiring the facility to be made unavailable to the providers and consumers. In some cases a provider will find it necessary to construct a new node in the tree (for example, where the provider seeks to add more information to the node than it can accept and the information will be spread out over several nodes, instead). Where this is the case, the provider process will use the provider interface methods to create new nodes and will then insert those nodes in the tree. Consumers will be directed to the new nodes. However, due to the concurrency support of the system, certain consumers may be attached to the old node. In this case, the provider process will use the provider interface methods to mark the old node as abandoned. Consumer processes will therefore be able to determine that the node to which they are attached has been replaced and can reattach to the new nodes, as required. As is indicated below, latch values are included in data structures in the node to permit concurrency support in the system. The concurrency model for a node is specified in the control block by the ConcurrencyInfo variable.

As referred to above, the preferred embodiment provides for nodes to be activated using a node control facility (and thus provide additional status information and a drill down capability). The node control facility may vary between different implementations. In the preferred embodiment, the node control facility is a generic control facility (sometimes referred to as GCF). The control facility is a set of methods that provide control over a service or object. It is consumer processes 16, 18 that will most often use the node control facility for activating a node in tree 20. However, provider processes 10, 12 may also activate nodes using the node control facility.

The use of the control facility in the preferred embodiment permits the dynamic status tree facility to have a "drill down" capability. The activation of a given node may, in turn, cause other, lower level nodes or an entire sub-tree to be generated or to be updated, permitting lower level diagnostics to be obtained when needed by consumer processes. For example, a particular monitor may be turned on by a consumer process accessing a defined service accessible using the control facility. In the preferred embodiment, a module implementing such a service may be pointed to by the GCFInfo variable in the SNode_t structure, referred to above.

The node control facility includes an interface that is made available to the consumer or provider processes. The interface permits modules implementing defined services to be accessed. The functionality provided by the interface includes the ability to start a service, stop a service, interrogate for the status of a service, and to make a request to the service. Typically the request function provided by the node control interface will be used by a consumer process having knowledge of the service being run when the node has been activated by starting the service. Such a consumer process will use the request function in the interface to send implementation dependent commands or requests to the controlled service specified by the node. Data from the service may be provided to the consumer by the same request interface function. The status interrogation function permits the consumer process to know whether the service referenced by the node is up, down or healthy. In the preferred embodiment, this function returns the current state of the service using the state indicators Operable, Alive and Available. A service is operable if it is installed and is considered capable of being started. A service is alive if it has one or more processes in memory. A service is available if it is able to take requests. Being 'available' implies being 'alive' as well as being 'operable' and being 'alive' implies being 'operable'.

As the above description indicates, the dynamic status tree facility of the preferred embodiment is defined so that provider processes are able to dynamically generate nodes and populate the nodes with status data. The node control facility of the preferred embodiment further permits the status tree to be dynamic from the consumer side of the system, as well as the provider side. Thus a consumer traversing the status tree is able to obtain information stored in the tree about the status of a given system and is also able use the node control facility to turn on further diagnostic and monitoring services that will potentially provide more status information for the consumer. The definition of the dynamic status tree facility permits the facility to be tailored to the monitoring of different systems and permits widely varying data to be represented in the nodes of the tree and communicated efficiently to consumer processes. The facility is therefore able to be used in heterogeneous environments and to remain operational while changes are made to the systems which are being monitored using the facility.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk.

What is claimed is:

1. A computer program product for a computing environment comprising provider processes to generate status information relating to one or more systems and consumer processes to obtain selected information from the said status information, the program product comprising a non-transitory computer usable medium having computer readable code means embodied in said medium for implementing a status facility, comprising
    defining and maintaining a tree data structure comprising nodes,
    defining and making accessible to the provider processes a set of provider methods, the provider methods comprising methods for the provider processes to create and define the content of nodes in the tree data structure, and
    defining and making accessible to the consumer processes a set of consumer methods, the consumer methods comprising methods for the consumer processes to access the content of nodes in the tree data structure.

2. The program product of claim 1 in which the content of each node in the tree data structure represents information and comprises a control block and a set of export information data,
    the control block comprising data defining characteristics of the node and comprising an export variable,
    the set of export information data comprising
        a variable number of defining elements and
        for each defining element in the set of defining elements, an
        associated list of export data items,
    each defining element and associated list of items having a corresponding export information type specified by the export variable in the control block and selected from a defined set of export information types.

3. The program product of claim 2 in which each defining element specifies a starting position for, and the space occupied by, the list of items in the node associated with the defining element.

4. The program product of claim 2, in which the defined set of export information types comprises
    an identifier type to identify a node,
    a set of local property types to specify status information,
    a set of base property types to specify status information,
    a dependent node type to identify dependent nodes in the tree data structure,
    a parent node type to identify the parent node in the tree data structure,
    a provider type to specify a provider process associated with a node, and
    a node control service type to specify a service accessible by a consumer process to carry out processing related to the node.

5. The program product of claim 1 in which the provider methods and the consumer methods comprise attaching to and detaching from the root node of the tree, adding dependent nodes, activating and deactivating nodes, and creating, adding, deleting, getting and setting content of the nodes in the tree data structure.

6. The program product of claim 1 in which the provider methods further comprise adding nodes to the tree data structure to replace one or more existing nodes in the tree data structure and marking the replaced nodes as abandoned.

7. The program product of claim 1 in which selected content of the nodes in the tree data structure is storable in a register sized value in the computing environment.

8. The program product of claim 2 further comprising defining and making available a set of property tags for identifying nodes and export information data.

9. The program product of claim 8 in which selected information represented in the nodes is definable by one of a set of representing data properties, the set of representing data properties comprising,
    a register property, representable in the computing environment by a register sized value and uniquely identifiable by the defined property tag,
    a variable property, representable in the computing environment by a data having a length longer than the register size and uniquely identifiable by the defined property tag,
    an identifier register property, representable in the computing environment by a register sized value and identifiable by the defined property tag in association with an identifier value, and
    an identifier variable property, representable in the computing environment by a data having a length longer than the register size and identifiable by the defined property tag in association with an identifier value.

10. The program product of claim 8, in which the node control block further comprises a node tag identifier having a value selectably defined from the set of property tags.

11. The program product of claim 10 in which the nodes in the tree data structure are storable in shared memory and in which the consumer methods and the provider methods provide an interface to information stored in nodes in the tree data structure using the shared memory.

12. The program product of claim 11, further comprising defining a node access data structure permitting a process to attach to a node in the tree data structure, the node access data structure comprising information to specify the location of the node in the shared memory, the node tag identifier for the node, an identifier for the node, and control information for the node.

13. The program product of claim 2, comprising implementing a node control facility comprising node control services and a set of methods selectably accessible by the consumer processes for the consumer processes to start, stop, interrogate status of, and pass requests to, the node control services.

14. The program product of claim 13, in which the node control services comprise expanding an identified node in the tree data structure into a sub-tree of the tree data structure.

15. The program product of claim 2 in which the nodes in the tree data structure are stored in shared memory and in which the consumer methods and the provider methods provide an interface to information stored in nodes in the tree data structure using the shared memory.

16. The program product of claim 2 in which the defined set of export information types is variable to permit provider processes to add one or more types to the defined set whereby provider processes may add export information data of the added types to the nodes of the tree data structure.

17. The program product of claim 2 in which the export variable comprises a series of ordered bits, each bit in the export variable corresponding to a unique export information type.

18. The program product of claim 17 in which the defined set of export information types is variable to permit provider processes to add one or more types to the defined set whereby provider processes may add export information data of the added types to the nodes of the tree data structure and in which the export variable for each node comprises bits defined to correspond to the added types.

19. The program product of claim 1 in which defining and making accessible a set of consumer processes further comprises defining and making accessible a node search consumer process for traversing the tree data structure to locate the node in the tree data structure having content matching a search parameter provided to the node search consumer process.

20. A method comprising storing in a computer system, and providing access to status information relating to one or more monitored systems, the method further comprising the steps of
    a) accepting status information from a set of provider processes,
    b) creating and defining one or more nodes in a tree data structure and defining content for selected nodes in the tree data structure based on the status information accepted,
    c) accepting requests from a set of consumer processes for obtaining selected information from the nodes in the tree data structure and
    d) providing the selected information to the consumer processes by accessing the content of specified nodes in the tree data structure.

21. The method of claim 20 in which the step of defining content for selected nodes in the tree data structure comprises the steps of defining information in a control block and in a set of export information data for each node in the selected nodes, the control block comprising data defining characteristics of the node and comprising an export variable, the set of export information data comprising
    a variable number of defining elements and
    for each defining element in the set of defining elements, an
    associated list of export data items,
each defining element and associated list of items having a corresponding export information type specified by the export variable in the control block and selected from a defined set of export information types.

22. The method of claim 21 in which the step of defining information in a set of export information data comprises defining each defining element to specify a starting position for, and the space occupied by, the list of items in the node associated with the defining element.

23. The method of claim 21, in which the step of defining information in a set of export information data comprises defining data to conform to types in the defined set of export information types, comprising
    an identifier type to identify a node,
    a set of local property types to specify status information,
    a set of base property types to specify status information,
    a dependent node type to identify dependent nodes in the tree data structure,
    a parent node type to identify the parent node in the tree data structure,
    a provider type to specify a provider process associated with a node, and
    a node control service type to specify a service accessible by a consumer process for carrying out processing related to the node.

24. The method of claim 21 further comprising the step of defining and making available a set of property tags to identify nodes and export information data.

25. The method of claim 24 in which the step of defining content for selected nodes comprises defining data to conform to one of a set of representing data properties, the set of representing data properties comprising,
    a register property, representable in the computer system by a register sized value and uniquely identifiable by the defined property tag,
    a variable property, representable in the computer system by a data having a length longer than the register size and uniquely identifiable by the defined property tag,
    an identifier register property, representable in the computer system by a register sized value and identifiable by the defined property tag in association with an identifier value, and
    an identifier variable property, representable in the computer system by a data having a length longer than the register size and identifiable by the defined property tag in association with an identifier value.

26. The method of claim 24, in which the step of defining content for selected nodes comprises the step of defining the node control block to comprise a node tag identifier having a value selectably defined from the set of property tags.

27. The method of claim 20 in which the step of creating nodes in the tree data structure comprises storing the nodes in shared memory to permit the provider processes and consumer processes to have an interface to information stored in the nodes in the tree data structure using the shared memory.

28. The method of claim 27, further comprising the step of defining a node access data structure permitting a process to attach to a node in the tree data structure, the node access data structure comprising information to specify the location of the node in the shared memory, the node tag identifier for the node, an identifier for the node, and control information for the node.

29. The method of claim 21, comprising the step of implementing a node control facility comprising node control services and a set of methods selectably accessible by the consumer processes for the consumer processes to start, stop, interrogate status of, and pass requests to, the node control services.

30. The method of claim 29, further comprising the step of invoking a defined node control service to expand an identified node in the tree data structure into a sub-tree of the tree data structure, in response to a request passes from one of the set of consumer processes.

31. The method of claim 21 comprising the step of adding one or more types to the defined set of export information types whereby provider processes may add export information data of the added types to the nodes of the tree data structure.

32. The method of claim 20 further comprising the step of traversing the tree data structure to locate a target node in the tree data structure having content matching a search parameter specified by a consumer process.

33. A computer-implemented system usable by provider processes to generate status information relating to one or more monitored systems and by consumer processes to obtain selected information from the said status information, wherein the computer executes instructions on a non-transitory computer readable medium to perform the following functions comprising
    defining and maintaining a tree data structure comprising nodes,
    defining and making accessible to the provider processes a set of provider methods, the provider methods comprising methods for the provider processes to create and define the content of nodes in the tree data structure, and
    defining and making accessible to the consumer processes a set of consumer methods, the consumer methods comprising methods for the consumer processes to access the content of nodes in the tree data structure.

34. The computer-implemented system of claim 33 in which the content of each node in the tree data structure represents information and comprises a control block and a set of export information data,
    the control block comprising data defining characteristics of the node and comprising an export variable,
    the set of export information data comprising
        a variable number of defining elements and
        for each defining element in the set of defining elements, an
        associated list of export data items,
    each defining element and associated list of items having a corresponding export information type specified by the export variable in the control block and selected from a defined set of export information types.

35. The computer-implemented system of claim 34 in which each defining element specifies a starting position for, and the space occupied by, the list of items in the node associated with the defining element.

36. The computer-implemented system of claim 34, in which the defined set of export information types comprises
    an identifier type to identify a node,
    a set of local property types to specify status information,
    a set of base property types to specify status information,
    a dependent node type to identify dependent nodes in the tree data structure,
    a parent node type to identify the parent node in the tree data structure,
    a provider type to specify a provider process associated with a node, and
    a node control service type to specify a service accessible by a consumer process for carrying out processing related to the node.

37. The computer-implemented system of claim 33 in which the provider methods and the consumer methods comprise attaching to and detaching from the root node of the tree, adding dependent nodes, activating and deactivating nodes, and creating, adding, deleting, getting and setting content of the nodes in the tree data structure.

38. The computer-implemented system of claim 33 in which the provider methods further comprise adding nodes to the tree data structure to replace one or more existing nodes in the tree data structure and marking the replaced nodes as abandoned.

39. The computer-implemented system of claim 33 in which selected content of the nodes in the tree data structure is storable in a register sized value in the computing environment.

40. The computer-implemented system of claim 34 further comprising defining and making available a set of property tags to identify nodes and export information data.

41. The computer-implemented system of claim 40 in which selected information represented in the nodes is definable by one of a set of representing data properties, the set of representing data properties comprising:
    a register property, representable in the computer system by a register sized value and uniquely identifiable by the defined property tag,
    a variable property, representable in the computer system by a data having a length longer than the register size and uniquely identifiable by the defined property tag,
    an identifier register property, representable in the computer system by a register sized value and identifiable by the defined property tag in association with an identifier value, and
    an identifier variable property, representable in the computer system by a data having a length longer than the register size and identifiable by the defined property tag in association with an identifier value.

42. The computer-implemented system of claim 40, in which the node control block further comprises a node tag identifier having a value selectably defined from the set of property tags.

43. The computer-implemented system of claim 42 in which the nodes in the tree data structure are storable in shared memory and in which the consumer methods and the provider methods provide an interface to information stored in nodes in the tree data structure using the shared memory.

44. The computer-implemented system of claim 43, further comprising defining a node access data structure permitting a process to attach to a node in the tree data structure, the node access data structure comprising information to specify the location of the node in the shared memory, the node tag identifier for the node, an identifier for the node, and control information for the node.

45. The computer-implemented system of claim 34, comprising implementing a node control facility comprising node control services and a set of methods selectably accessible by the consumer processes for the consumer processes to start, stop, interrogate status of, and pass requests to, the node control services.

46. The computer-implemented system of claim 45, in which the node control services comprise expanding an identified node in the tree data structure into a sub-tree of the tree data structure.

47. The computer-implemented system of claim 34 in which the nodes in the tree data structure are stored in shared memory and in which the consumer methods and the provider methods provide an interface to information stored in nodes in the tree data structure using the shared memory.

48. The computer-implemented system of claim 34 in which the defined set of export information types is variable to permit provider processes to add one or more types to the defined set whereby provider processes may add export information data of the added types to the nodes of the tree data structure.

49. The computer-implemented system of claim 34 in which the export variable comprises a series of ordered bits, each bit in the export variable corresponding to a unique export information type.

50. The computer-implemented system of claim 49 in which the defined set of export information types is variable to permit provider processes to add one or more types to the defined set whereby provider processes may add export information data of the added types to the nodes of the tree data structure and in which the export variable for each node comprises bits defined to correspond to the added types.

51. The computer-implemented system of claim 33 in which defining and making accessible a set of consumer processes comprises defining and making accessible a node search consumer process to traverse the tree data structure to locate the node in the tree data structure having content matching a search parameter provided to the node search consumer process.

52. A non-transitory computer readable medium containing program instructions to store in a computer system, and to provide access to status information relating to one or more monitored systems, the program instructions comprising:
  a) accepting status information from a set of provider processes,
  b) creating and defining one or more nodes in a tree data structure and defining content for selected nodes in the tree data structure based on the status information accepted,
  c) accepting requests from a set of consumer processes to obtain selected information from the nodes in the tree data structure and
  d) providing the selected information to the consumer processes by accessing the content of specified nodes in the tree data structure.

53. The non-transitory computer readable medium of claim 52 in which the step of defining content for selected nodes in the tree data structure comprises the steps of defining information in a control block and in a set of export information data for each node in the selected nodes,
  the control block comprising data defining characteristics of the node and comprising an export variable,
  the set of export information data comprising
    a variable number of defining elements and
    for each defining element in the set of defining elements, an
    associated list of export data items,
  each defining element and associated list of items having a corresponding export information type specified by the export variable in the control block and selected from a defined set of export information types.

54. The non-transitory computer readable medium of claim 52 in which the step of defining information in a set of export information data comprises defining each defining element to specify a starting position for, and the space occupied by, the list of items in the node associated with the defining element.

55. The non-transitory computer readable medium of claim 52, in which the step of defining information in a set of export information data comprises defining data to conform to types in the defined set of export information types, comprising:
  an identifier type to identify a node,
  a set of local property types to specify status information,
  a set of base property types to specify status information,
  a dependent node type to identify dependent nodes in the tree data structure,
  a parent node type to identify the parent node in the tree data structure,
  a provider type to specify a provider process associated with a node; and
  a node control service type to specify a service accessible by a consumer process for carrying out processing related to the node.

56. The non-transitory computer readable medium of claim 52 further comprising the step of defining and making available a set of property tags to identify nodes and export information data.

57. The non-transitory computer readable medium of claim 56 in which the step of defining content for selected nodes comprises defining data to conform to one of a set of representing data properties, the set of representing data properties comprising:
  a register property, representable in the computer system by a register sized value and uniquely identifiable by the defined property tag,
  a variable property, representable in the computer system by a data having a length longer than the register size and uniquely identifiable by the defined property tag,
  an identifier register property, representable in the computer system by a register sized value and identifiable by the defined property tag in association with an identifier value, and
  an identifier variable property, representable in the computer system by a data having a length longer than the register size and identifiable by the defined property tag in association with an identifier value.

58. The non-transitory computer readable medium of claim 56, in which the step of defining content for selected nodes comprises the step of defining the node control block to comprise a node tag identifier having a value selectably defined from the set of property tags.

59. The non-transitory computer readable medium of claim 58 in which the step of creating nodes in the tree data structure comprises storing the nodes in shared memory to permit the provider processes and consumer processes to have an interface to information stored in the nodes in the tree data structure using the shared memory.

60. The non-transitory computer readable medium of claim 58, further comprising the step of defining a node access data structure permitting a process to attach to a node in the tree data structure, the node access data structure comprising information to specify the location of the node in the shared memory, the node tag identifier for the node, an identifier for the node, and control information for the node.

61. The non-transitory computer readable medium of claim 52, comprising the step of implementing a node control facility comprising node control services and a set of methods selectably accessible by the consumer processes for the consumer processes to start, stop, interrogate status of, and pass requests to, the node control services.

62. The non-transitory computer readable medium of claim 61, further comprising the step of invoking a defined node control service to expand an identified node in the tree data structure into a sub-tree of the tree data structure, in response to a request passes from one of the set of consumer processes.

63. The non-transitory computer readable medium of claim 52 comprising the step of adding one or more types to the defined set of export information types whereby provider processes may add export information data of the added types to the nodes of the tree data structure.

64. The non-transitory computer readable medium of claim 51 further comprising the step of traversing the tree data structure to locate a target node in the tree data structure having content matching a search parameter specified by a consumer process.

65. A non-transitory computer readable medium containing program instructions for a computing environment comprising provider processes to generate status information relating to one or more systems and consumer processes to obtain selected information from the said status information, the program instructions for:
  (a) defining and maintaining a tree data structure comprising nodes,
  (b) defining and making accessible to the provider processes a set of provider methods, the provider methods comprising methods for the provider processes to create and define the content of nodes in the tree data structure; and
  (c) defining and making accessible to the consumer processes a set of consumer methods, the consumer methods comprising methods for the consumer processes to access the content of nodes in the tree data structure.

66. The non-transitory computer readable medium of claim 65 in which the content of each node in the tree data structure represents information and comprises a control block and a set of export information data,
  the control block comprising data defining characteristics of the node and comprising an export variable,
  the set of export information data comprising:
    a variable number of defining elements, and
    for each defining element in the set of defining elements, an
    associated list of export data items,
  each defining element and associated list of items having a corresponding export information type specified by the export variable in the control block and selected from a defined set of export information types.

67. The non-transitory computer readable medium of claim 66 in which each defining element specifies a starting position for, and the space occupied by, the list of items in the node associated with the defining element.

68. The non-transitory computer readable medium of claim 66, in which the defined set of export information types comprises
  an identifier type to identify a node,
  a set of local property types to specify status information,
  a set of base property types to specify status information,
  a dependent node type to identify dependent nodes in the tree data structure,
  a parent node type to identify the parent node in the tree data structure,
  a provider type to specify a provider process associated with a node, and
  a node control service type to specify a service accessible by a consumer process for carrying out processing related to the node.

* * * * *